Nov. 16, 1943.   W. R. MEYER   2,334,639
CRANKSHAFT CHUCK
Filed Sept. 4, 1942
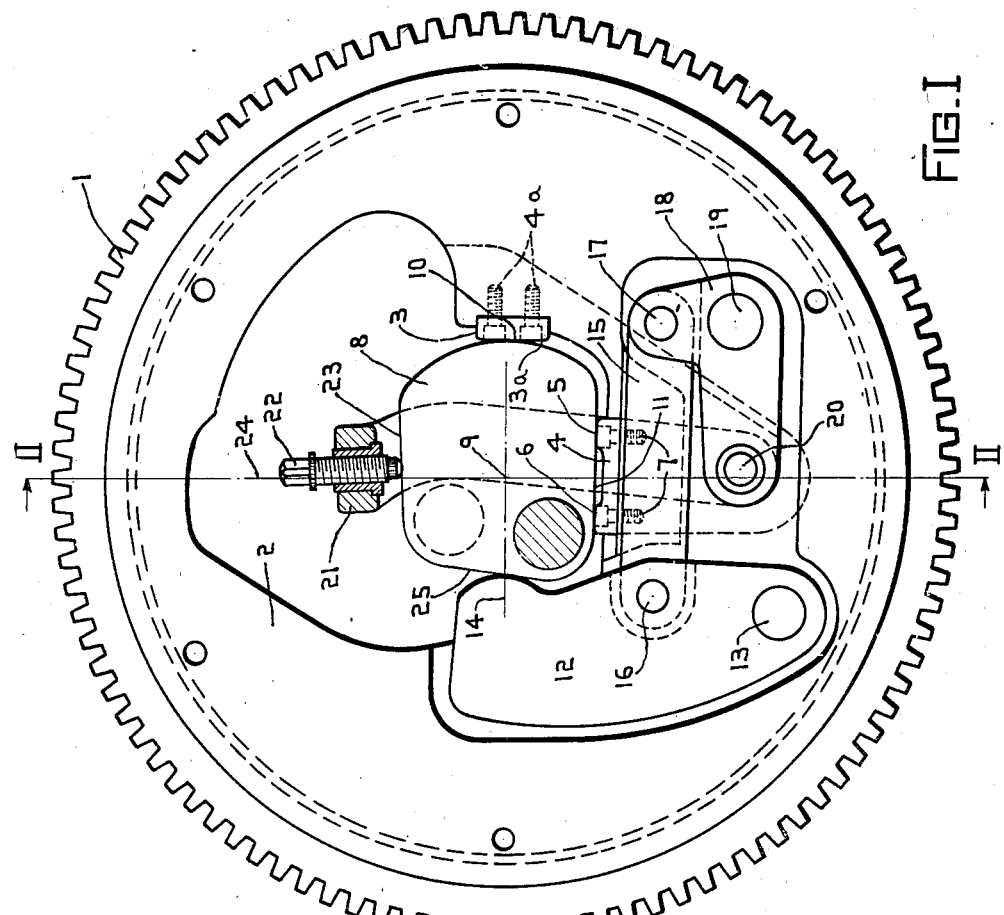
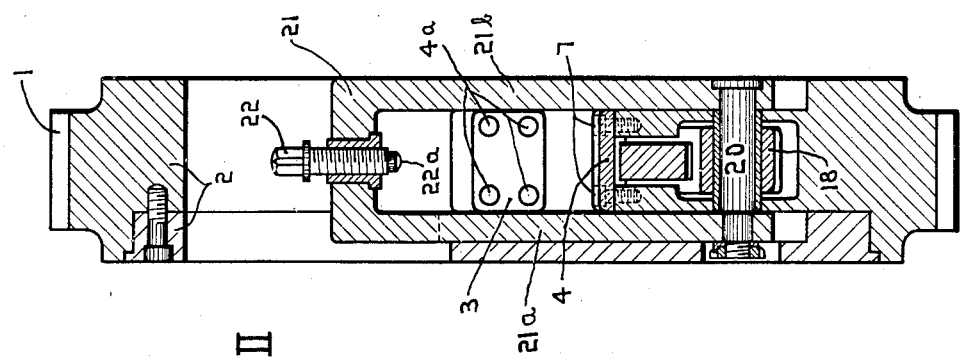
INVENTOR.
WALTER R. MEYER
BY Willard S. Groene Patented Nov. 16, 1943

2,334,639

UNITED STATES PATENT OFFICE 2,334,639

CRANKSHAFT CHUCK

Walter R. Meyer, Cincinnati, Ohio, assignor to The R. K. Le Blond Machine Tool Company, Cincinnati, Ohio, a corporation of Delaware Application September 4, 1942, Serial No. 457,273

3 Claims. (Cl. 82—40)

This invention pertains to crankshaft chucks and is particularly related to chucking devices which are adapted to grip crankshafts in center drive crankshaft lathes, the work being located and supported at each end by center pins or equivalent centering devices and the chucks grip the crankshaft intermediate these end supporting members, preferably by means of the webs of such crankshafts.

More particularly the chucking devices are adapted to grip the crankshaft, so located on end centering devices, by means of locating surfaces on the crankshaft web having a predetermined relationship to the axis of rotation of the crankshaft and to the work spindle of the lathe.

Another object of this invention is to provide in a chucking device for lathes means whereby the tightening device may be operated to effect gripping of the work piece by the chuck with the simultaneous application of the work engaging means operating from four different directions toward the center of rotation of the work piece, all of said movements being simultaneously effected from a single clamping member.

Another object of this invention is to provide in a crankshaft chucking device a pair of fixed work engaging abutments mounted in the chuck body so as to engage the work from substantially perpendicular directions and to provide a single clamping device which simultaneously applies clamping action to the work piece to present it to both of said fixed abutments with substantially equal pressure by the operation of a single clamping mechanism.

Further features and advantages of this invention will appear from a detailed description of the drawing in which:

Figure I is an axial view of a center drive ring gear chucking device or crankshaft chuck incorporating the principles of this invention.

Figure II is a diametral cross-section on the line II—II of Figure I through the chucking device, particularly showing the fixed abutments and the clamping member associated therewith.

This invention is shown applied to a typical center drive chuck but may, of course, be applied to any type of machine tool work spindle wherein the work is to be gripped and rotated while performing machining operations thereon. In this particular exemplary showing of the center drive type of chuck or work spindle there is shown the driving gear 1 which is driven from usual power transmission mechanism as is typical in center drive work spindles in center drive lathes. The chuck body 2 is fixed to the ring gear and may be formed integrally therewith and is provided with a thick abutment 3 held in place in the chuck body by suitable screws 4a, also in this chuck the work engaging abutment 4 having two work engaging surfaces 5 and 6 and held in place on the chuck body 2 by appropriate screws 7.

The work piece or crankshaft 8 to be gripped in the chucking device has its main axis 9 determined by the usual center holes drilled in the ends of the crankshaft (which is not shown) and located on appropriate centering devices typical of center drive lathes. In this instance the center holes which determine the axis of rotation 9 of the crankshaft are accurately machined in a predetermined relationship to the exterior portions 10 and 11 of the crankshaft web 8. Similarly the surfaces 3a of the fixed locating block 3 and the surfaces 5 and 6 of the locating block 4 are located in a predetermined and similar relationship to the axis of rotation 9 of the chucking device. Thus when the crankshaft web 8 is placed in the chuck in engagement with the surfaces 3a, 5, and 6 of the chucking device the crankshaft web and its main axis of rotation 9 will be brought precisely on the axis of rotation 9 of the chuck body.

The crankshaft web 8 in this position is rigidly and positively held against the abutment blocks 3 and 4 by clamping devices comprising a clamping arm 12 which is mounted on a pivot pin 13, fixed in the chuck body so that it swings to and from the work piece in a direction substantially along the line 14 to force the crankshaft web 8 toward the work engaging surface 3a of the abutment block 3. Connected to this clamping arm 12 is a link 15 connected by a suitable pivot pin 16 to the arm 12 and connected at its other end to a pin 17 of the bell-crank lever 18 carried on a pivot pin 19 fixed in the chuck body 2. A horizontally projecting arm of the bell-crank 18 has a pin 20 upon which is mounted the bifurcated clamping member 21 as best seen in Figure II. This clamping member 21 has downwardly extending side arm portions 21a and 21b each of which is pivotally mounted around the end 20 of the bell-crank 18. In the upper portion of this clamping member 21 is the clamping screw 22 which has its lower work engaging abutment portion 22a coming down on top of the surface 23 of the crankshaft web 8 to force the crankshaft downwardly in the direction of the line 21 so as to force the web 8 against the abutment surfaces 5 and 6 of the abutment block 4 in the chuck body.

It will, therefore, be obvious that when the clamping screw 22 is tightened to bring its end 22a down upon the surface 23 of the crankshaft web 8 that it will tend to force the web against the block 4 and resistance of the block 4 to further movement of the crankshaft web 8 will cause the clamping member 21 to move upwardly, swinging the horizontal arm of the bellcrank 18 on its pivot 19 upwardly and causing the link 15 to move horizontally to the right and thereby move the clamping arm 12 toward the surface 25 of the crankshaft web forcing this web, at the same time that it is being forced down against the block 4, against the fixed abutment block 3 of the chuck body 2. Therefore, by tightening the screw 22 the crankshaft is automatically and simultaneously urged with substantially equal pressure against both the abutment blocks 3 and 4 so as to rigidly support the crankshaft in the chucking device in proper alignment with the axis of rotation 9.

Having fully set forth and described my invention what I claim as new and desire to secure by Letters Patent is:

1. In a chucking device, a rotary chuck body, a fixed abutment in said chuck body located to one side of the axis of rotation thereof, a second fixed abutment located to one side of said axis positioned substantially perpendicular to said first mentioned abutment, a clamping member pivotally mounted on said chuck body for swinging movement to and from one of said abutments, a second clamping member pivotally mounted on a bell-crank lever mounted on the chuck body, for movement toward said other fixed abutment, and linkage connection means between said bell-crank lever and said first mentioned clamping member whereby moving of said second clamping member against a work piece in said chuck automatically effects the movement of said first mentioned clamping member into engagement with said work piece in a direction substantially perpendicular to the clamping action of such second mentioned clamping device.

2. In a chucking device, a rotary chuck body, a fixed abutment in said chuck body located to one side of the axis of rotation thereof, a second fixed abutment located to one side of said axis positioned substantially perpendicular to said first mentioned abutment, a clamping member pivotally mounted on said chuck body for swinging movement to and from one of said abutments, a second clamping member pivotally mounted on a bell-crank lever mounted on the chuck body, for movement toward said other fixed abutment, and linkage connection means between said bell-crank lever and said first mentioned clamping member whereby moving of said second clamping member against a work piece in said chuck automatically effects the movement of said first mentioned clamping member into engagement with said work piece in a direction substantially perpendicular to the clamping action of such second mentioned clamping device, said clamping members being movable to their respective abutments in substantially perpendicular direction to each other.

3. In a crankshaft chuck, a rotary chuck body, a fixed abutment in said chuck body located to one side of the axis of rotation thereof, a second fixed abutment in said chuck body located substantially perpendicular to said first mentioned abutment and located to one side of the axis of rotation thereof, a clamping arm pivotally mounted on said chuck body having a work engaging portion movable in a direction perpendicular to one of said fixed abutments, a bell-crank lever pivotally mounted on said chuck body, linkage connections between said clamping arm and said crank lever, a bifurcated clamping device pivotally mounted on the other end of said bell-crank lever, and a clamping screw in said bifurcated clamping device for engaging a work piece to move it in a direction perpendicular to said other work engaging abutment, said linkage connection between said clamping arm and bifurcated clamping device serving to effect a simultaneous application of clamping pressure of said clamping arm and said clamping screw on a work piece in engagement with said fixed abutments in said chucking device.

WALTER R. MEYER.